(12) United States Patent
Lea

(10) Patent No.: US 12,428,109 B2
(45) Date of Patent: Sep. 30, 2025

(54) SHIP AND A METHOD FOR BRINGING LIQUIFIED GAS FROM AN ONSHORE TERMINAL ACROSS A SEA TO A SUBSURFACE PERMANENT STORAGE RESERVOIR

(71) Applicant: Tore Lea, Stavanger (NO)

(72) Inventor: Tore Lea, Stavanger (NO)

(73) Assignee: Tore Lea, Stavanger (NO)

( * ) Notice: Subject to any disclaimer, the term of this patent is extended or adjusted under 35 U.S.C. 154(b) by 204 days.

(21) Appl. No.: 18/267,212

(22) PCT Filed: Dec. 15, 2021

(86) PCT No.: PCT/NO2021/050265
§ 371 (c)(1),
(2) Date: Jun. 14, 2023

(87) PCT Pub. No.: WO2022/131926
PCT Pub. Date: Jun. 23, 2022

(65) Prior Publication Data
US 2024/0076013 A1    Mar. 7, 2024

(30) Foreign Application Priority Data
Dec. 18, 2020 (NO) .................................. 20201398

(51) Int. Cl.
*B63B 27/25*    (2006.01)
*B63B 25/16*    (2006.01)
(Continued)

(52) U.S. Cl.
CPC .............. *B63B 25/16* (2013.01); *B63B 27/25* (2013.01); *B63B 27/34* (2013.01); *B63B 35/44* (2013.01); *B63B 2035/448* (2013.01)

(58) Field of Classification Search
CPC ... B63B 27/24; B63B 27/34; B63B 2035/448; F17C 1/002
See application file for complete search history.

(56) References Cited

U.S. PATENT DOCUMENTS 3,830,180 A * 8/1974 Bolton .................... B63B 25/16
                                                          114/74 A
4,446,804 A   5/1984 Kristiansen
(Continued)

FOREIGN PATENT DOCUMENTS

EP    2441661    4/2012
EP    2738082    6/2014
(Continued)

OTHER PUBLICATIONS

"CO2 maritime transportation"; Sandrine Decarre et al.(2010); International Journal of Greenhouse Gas Control 4 (2010) 857-864; 1750-5836; published 2010.
(Continued)

*Primary Examiner* — Jason K Niesz
(74) *Attorney, Agent, or Firm* — Andrus Intellectual Property Law, LLP

(57) ABSTRACT

A ship and a method are for bringing liquified gas, such as liquified carbon dioxide, $CO_2$, from an onshore terminal for captured gas across a sea to a subsurface permanent storage reservoir. The ship has a loading line for communicating liquified gas from the onshore terminal into at least one vessel, and a processing plant. The processing plant of the ship has an injection processing module configured for injecting liquified gas into the subsurface permanent storage reservoir, wherein the injection processing module is operatively connected to the at least one vessel and an injection line provided with a connector for connecting to a flexible (Continued)

injection hose being in fluid communication with the subsurface permanent storage reservoir.

10 Claims, 6 Drawing Sheets

(51) Int. Cl.
*B63B 27/34* (2006.01)
*B63B 35/44* (2006.01)

(56) References Cited

U.S. PATENT DOCUMENTS

| | | | |
|---|---|---|---|
| 2010/0000252 A1* | 1/2010 | Morris | F17C 11/007 62/53.2 |
| 2019/0359289 A1* | 11/2019 | Brinkel | B63B 25/16 |

FOREIGN PATENT DOCUMENTS

| | | |
|---|---|---|
| GB | 2470122 | 11/2010 |
| GB | 2549001 | 10/2017 |
| JP | 4763915 B2 | 8/2011 |
| JP | 2012013146 | 1/2012 |
| KR | 20100065828 | 6/2010 |
| KR | 20110074056 | 6/2011 |
| KR | 20110123056 | 11/2011 |
| KR | 101103703 B1 | 1/2012 |
| KR | 20120126994 | 11/2012 |
| WO | 03066423 A1 | 8/2003 |
| WO | 2006008486 | 1/2006 |
| WO | 2010145808 | 12/2010 |
| WO | 2013025108 | 2/2013 |
| WO | 2013083663 | 6/2013 |
| WO | 2016097729 | 6/2016 |
| WO | 2018234721 A1 | 12/2018 |
| WO | 2019017796 | 1/2019 |

OTHER PUBLICATIONS

"Knowledge Sharing Report—CO2 Liquid Logistics Shipping Concept (LLSC) Overall Supply Chain Optimization"; T. N. Vermeulen, (2011); Tebodin Netherlands BV, Vopak, Anthony Veder and GCCSI; Report No. 3112001; publisert 2011.

"An evaluation of key challenges of CO2 transportation with a novel Subsea Shuttle Tanker"; Y Ma et al 2021 IOP Conf. Ser.: Mater. Sci. Eng. 1201 012078; published Nov. 2021.

"Optimum liquefaction fraction for boil-off gas reliquefaction system of semipressurized liquid CO2 carrier based on economic evaluation"; Bongsik Chu et al., International Journal of Greenhouse Gas Control 10 (2012) 46-55; publisert Jun. 2012.

CO2 transport by ship: the way forward in Europe; Filip Neele et al (2017); Energy Procedia 114 (2017) 6824-6834; published in 2017.

Ship Transport of CO2 Technical Solutions and Analysis of Costs, Energy Utilization, Exergy Effciency and CO2 Emissions; A. Aspelund et al (2006); Trans ChemE, Part A, Sep. 2006; Chemical Engineering Research and Design, 84(A9): 847-855; 0263-8762/06; doi: 10.1205/cherd.5147; published in 2006.

"A Study on Re-Liquefaction Process of Boil-off Gas of LCO2 Transfer Ship"; Yeongbeom Lee et al (2014); published in 2014.

"Modeling and Simulation of Ship Transport of CO2"; Seok Goo Lee et al (2012); Symposium on Process Systems Engineering; published Jul. 15-19, 2012.

"Design of boil-off CO2 re-liquefaction processes for a large-scale liquid CO2 transport ship"; Y. Lee et al.; International Journal of Greenhouse Gas Control 67 (2017) 93-102.

Norwegian Search Report for No. 20201398, dated Jul. 10, 2021.

International Search Report and Written Opinion for PCT/NO2021/050265, dated Feb. 22, 2022.

Response to the Written Opinion for PCT/NO2021/050265, dated Jun. 8, 2022.

Second Written Opinion for PCT/NO2021/050265, dated Mar. 16, 2023.

International Preliminary Report on Patentability for PCT/NO2021/050265, dated Mar. 20, 2023.

Northern Lights Project Concept Report, RE-PM673-00001, from Equinor. Accessed via URL: https://norlights.com/wp-content/uploads/2021/03/Northern-Lights-Project-Concept-report.pdf. Published May 21, 2019.

Supplementary Search Report for European Application No. 21907205, issued Oct. 17, 2024.

Suzukia, et al. "Conceptual Design of CO2 Transportation System for CCS", Energy Procedia 37 ( 2013 ) 2989-2996.

Appeal against the NIPO's decision in Norwegian patent No. NO 346899, dated Feb. 14, 2025.

* cited by examiner

SHIP AND A METHOD FOR BRINGING LIQUIFIED GAS FROM AN ONSHORE TERMINAL ACROSS A SEA TO A SUBSURFACE PERMANENT STORAGE RESERVOIR

CROSS-REFERENCE TO RELATED APPLICATIONS

This application is the U.S. national stage application of International Application PCT/NO2021/050265, filed Dec. 15, 2021, which international application was published on Jun. 23, 2022, as International Publication WO 2022/131926 in the English language. The International Application claims priority of Norwegian Patent Application No. 20201398, filed Dec. 18, 2020. The international application and Norwegian application are both incorporated herein by reference, in entirety

FIELD

The present disclosure is related to ship-transport of liquified gas. More particularly, the disclosure is related to a ship and a method for bringing liquified gas from an onshore loading terminal across sea to a subsurface permanent storage reservoir. By the term liquified gas is meant any gas which can be made liquid by a process combination of pressure and temperature.

BACKGROUND

By the term onshore loading terminal is meant herein a terminal configured for transferring a liquified gas from a source of liquified gas on land, and into the ship. During loading, the ship may be moored at a quay, a jetty, or at a loading buoy or similar being in fluid communication with the source of liquified gas. The liquified gas may for example be liquified carbon dioxide ($CO_2$) that has been captured, liquified and transported to the onshore terminal.

An onshore loading terminal discussed herein may comprise storage tanks for temporarily storing liquified gas on land before being loading the gas onboard the ship, or the onshore loading terminal may be configured for so-called Direct Shuttle Loading (DSL) wherein at least two ships operate in a continuous operation between shore and a location of the subsurface permanent storage reservoir.

In a DSL, one of at least two ships may for a majority of time be moored for example at an onshore jetty, thereby the ship representing a loading terminal for liquified gas to be communicated directly from a transport means on land into the ship. Thus, in operation, a DSL requires that a ship for receiving the gas is available at the onshore loading terminal. However, a DSL does not require land-based tanks for intermediate storage of gas received from a transport means. The transport means may be one or more tanks transported on roads or by railway, or the transport means may even pipelines.

By the term subsurface permanent storage reservoir is meant a reservoir, for example, but not limited to, an abandoned petroleum reservoir having at least one well provided with a closable inlet(s) and capable of providing a sealed enclosure for the gas. At reservoir saturation, the at least one well will be permanently plugged, and the storage reservoir will be permanently abandoned.

In principle, any liquified gas can be injected in a subsurface permanent storage reservoir. However, a liquified gas being of particularly great interest for being injected into a subsurface permanent storage reservoir, is liquified $CO_2$. For this reason, the invention is described with regards to a ship and a method for bringing liquified $CO_2$ from an onshore terminal temporarily storing liquified $CO_2$ that has been captured, liquified and transported to the onshore terminal.

Other liquified gases that may be transported from an onshore terminal across sea to a subsurface permanent storage reservoir are for example, but not limited to, liquified Greenhouse gases such as for example nitrogen oxide ($NO_x$), ozone ($O_3$), methane ($CH_4$), fluorinated gases including halogens, liquified petroleum gases (LPG) and liquified noble gases.

$CO_2$ emissions to the atmosphere is one of the major contributors to global climate challenges. One of the challenges is melting of polar ice caps. NASA has estimated that the polar ice caps are melting 9% every ten years, which is an extremely alarming rate. If the temperature on earth continues to rise at its current rate the Arctic will have no ice by 2040. The Arctic ice cap has decreased since the 1960s by as much as 40%. Emission of $CO_2$ represents an important negative factor with respect to global environment. The United States Environmental Protection Agency (EPA) estimates that $CO_2$ represents about 65% of the global greenhouse gas emissions.

Governments have therefore an expressed goal of reducing $CO_2$ emission. An important contribution for achieving this goal is to develop carbon capture and storage, so called CCS, wherein the $CO_2$ is captured onshore by industrial $CO_2$-emitters.

Hitherto it has been possible for a polluter to buy so-called $CO_2$ quotas which has been preferred in view of an economic perspective. A negative consequence of the possibility of buying $CO_2$ quotas is that development and implementation of new technology has suffered, while at the same time $CO_2$-emission is not reduced as required. However, some governments have realized that effective carbon capture technologies are urgently needed and have therefore decided to invest in developing such technologies and fund the implementation of such.

The basis for an international CCS market is The Paris Agreement regarding global warming (signed up by approximately 175 nations) and the EU goal of being carbon neutral by 2050.

According to the UN Climate Panel, the capture, transport, and storage of CO2-emissions from industrial production is a key step in reducing global greenhouse gas emissions. Storage can be done in a sustainable way by using a secure location, for example in an offshore reservoir.

One challenge related to CCS has been related to permanent storage reservoirs. However, there are now several available subsurface permanent storage reservoirs for example in the North Sea, wherein captured $CO_2$ can be stored in a particular reservoir located 1000-3300 meters below seabed. However, a reservoir suitable for storing captured $CO_2$ can be located at other depths below seabed than those mentioned above.

In the publication "Northern Lights Project Concept report" Doc. No. RE-PM673-00001 issued by Equinor, it is suggested to transport $CO_2$ captured and compressed at industrial sources in the Oslofjord region, by means of smaller ships to an onshore terminal on the Norwegian west coast, and from the onshore terminal via a pipeline to an offshore storage complex in the North Sea. By the term "smaller ships" is in this document meant ships having a capacity of carrying up to about 7500 m³ liquid $CO_2$.

Based on the governments expressed goals to reach the global climate goals of The Paris Agreement, industrial plants for capturing $CO_2$ are one of a variety of solutions for achieving the global climate goals. In the future when such plants are in operation, a capacity problem for the onshore terminal may arise due to a significant number of ships arriving at the terminal, as well as a limited temporarily storage capacity at the onshore terminal. Another challenge related to projects like the proposed Northern Lights Project, is related to the lack of flexibility related to volume and location of the infrastructure for flowing the $CO_2$ from the onshore terminal to the subsurface reservoir.

Publication JP2012013146A discloses a flexible tube capable of transporting fluid such as liquified carbon dioxide, and use of the flexible tube when pumping liquified carbon dioxide from a ship to an injection well.

Publication KR2011012356A discloses an LNG ship comprising a storage tank for storing liquified carbon dioxide and at least one pump for pumping the carbon dioxide from the storage tank and directly into an underground storage, without the use of a surface offshore structure being arranged between the ship and the underground storage.

Publication KR20110074056A discloses a method for transporting liquified carbon dioxide from a storage tank of a ship, via a surface platform comprising a pump, and into an underground reservoir.

Publication GB2470122A discloses a subsea high-pressure liquid carbon dioxide storage equipment. The equipment includes a carrier, such as a ship, for holding and carrying high-pressure liquid carbon dioxide; a water-surface power supply equipment arranged on the surface of the water to supply power; a subsea storage equipment having high-pressure liquid carbon dioxide stored therein; a relay flotation tank having high-pressure liquid carbon dioxide stored therein; and an undersea injection pump configured to inject high-pressure liquid carbon dioxide into an undersea storage base and fixedly provided in the seabed. The storage equipment may comprise a buoyancy controller using seawater influx and discharge pumps to regulate the buoyancy of the storage tank. The storage equipment disclosed in GB2470122A is relative complex and costly and must be installed for each undersea storage base.

Publication GB2549001A discloses a method for offshore carbon dioxide based enhanced oil recovery (EOR) or for offshore carbon dioxide based enhanced gas recovery (EGR), wherein $CO_2$ in the liquid or super-critical state is delivered by at least one carrier vessel from at least one $CO_2$ storage site to an integrated offshore facility. The offshore facility is provided with at least one on-site storage tank or vessel adapted to store $CO_2$ in the liquid or super-critical state and equipment for marine transfer of $CO_2$ in the liquid or super-critical state. The $CO_2$ must be transferred from the at least one carrier vessel to the offshore facility comprising the at least on-site storage tank, and the method requires the offshore facility in addition to the at least one carrier vessel.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect of the invention, there is provided a ship for bringing liquified gas, such as liquified carbon dioxide ($CO_2$), from an onshore loading terminal across a sea to a subsurface permanent storage reservoir, the ship comprising a loading line for communicating liquified gas received from the onshore terminal into at least one vessel onboard the ship, and a processing plant. The processing plant comprises:
an injection processing module comprising an injection pump configured for injecting liquified gas into the subsurface permanent storage reservoir;
wherein the injection processing module is operatively connected to the at least one vessel and a gas injection line provided with a connector for connecting to a flexible injection hose extending from a subsea connection point being connected to a well of the subsurface permanent storage reservoir. The ship is a shuttle tanker comprising a storage tank having a larger volume than the at least one vessel, wherein a portion of the at least one vessel is housed within the storage tank.

The liquified gas may typically be liquified $CO_2$.

One effect of communicating liquified gas via the injection line with a connector for connecting to a flexible injection hose being in fluid communication with the subsurface permanent storage reservoir is that the captured gas is transported directly from the onshore terminal to the subsurface permanent storage reservoir. By the term directly is meant that the gas is transported to the subsurface permanent storage reservoir without being reloaded via an onshore storage terminal or offshore storage unit. It should be noted that the ship may be loaded with liquified gas collected from more than one onshore terminal at various locations prior to bringing liquified gas across a sea to the subsurface permanent storage reservoir.

The flexible injection hose may be a so-called riser, based on the same technology as utilized for bringing a petroleum product form the reservoir to a ship.

Thus, a great advantage of the present invention is that any intermediate onshore or offshore storage and injection facility between the terminal or terminals and the subsurface permanent storage reservoir, is superfluous. Further, a pipeline from such an intermediate onshore storage facility to the subsurface permanent storage reservoir will also be superfluous. Such a pipeline may be very long. As an example, in the above mentioned "Northern Light" the pipeline will have a length of about 100 km. Such a pipeline is very expensive with respect to both manufacturing costs and installation costs, and costs related to subsequent removal of any non-buried portions of the pipeline after permanently plugging and abandoning a filled-up subsurface permanent storage reservoir.

Thus, the effect of communicating liquified gas, such as for example but not limited to liquified $CO_2$, from the ship via an injection line provided with a connector for connecting to a flexible injection hose being in fluid communication with the subsurface permanent storage reservoir is that the ship according to the invention replaces extremely expensive infrastructure while at the same time being flexible with respect to collecting captured gas from various future onshore terminals that are expected to arise for example in Europe, and with respect to various subsurface permanent storage reservoirs.

In the petroleum industry, a crude oil shuttle tanker has typically an operating lifetime of about 20 years, whereinafter it is superannuated. However, during its operating lifetime, such a ship is subject to mandatory inspections and maintenance. Thus, even if a crude oil shuttle tanker is superannuated from its intended service, it is oftentimes in a perfect condition for other purposes.

To exploit the valuable resource represented by a superannuated crude oil shuttle tanker, the inventor has found that it can be adapted for use as an injection-ship according to the present invention.

The processing plant may further comprise a liquifying processing module configured for liquifying gas, wherein the at least one vessel is in loop communication with the liquifying processing module so that gas evaporated from the liquified gas within the at least one vessel is liquified in the liquifying processing module and communicated back into the at least one vessel.

The effect of liquifying gas evaporated from the liquified gas within the at least one vessel and communicating the liquified gas back into the at least one vessel, is that the evaporated gas is recirculated back into the vessel, thereby avoiding gas emission for example during loading at the onshore terminal and/or during voyage from the onshore terminal to the subsurface permanent storage reservoir. Without such a recirculation, as much as 10-15% of the gas load may be lost through evaporation through the transport value chain, i.e., during loading, transport, and injection.

In one embodiment, the at least one vessel may comprise a first portion and a second portion, wherein the first portion extending above a main deck of the ship, and wherein pipes for communicating gas from the at least one vessel to the process plant are connected to the first portion. The effect of this is that for example a superannuated shuttle tanker can be adapted to its new service purpose substantially without any intervention of the structure of the ship.

Preferably, the second portion of the at least one vessel extends into the tank having a larger volume than the at least one vessel. Said tank may be a previous petroleum, typically crude oil, storage tank of a shuttle tanker. Thus, in such an example of utilizing a superannuated shuttle tanker, apart from providing an aperture in said tank for receiving the second portion of the gas vessel, the originally installed storage tank remains in place.

In a preferred embodiment, the at least one vessel comprises a plurality of vessels extending into the larger volume tank. Thus, the plurality of vessels may form a cluster of vessels within said tank. In one embodiment, the ship may comprise a plurality of said larger volume tank. Thus, the gas transport capacity of the ship may be scalable to meet specific needs from a few thousands $m^3$ as suggested in the "Northern Lights Project Concept report" mentioned above, to more than 100.000 $m^3$.

In a preferred embodiment, the at least one vessel is oblongness, i.e., having a tubular form, wherein a longitudinal axis of the vessel may be substantially perpendicular to a surface of the main deck of the ship. This has the effect of minimizing a surface area of the liquified gas from which gas may evaporate, while at the same time facilitating connection of piping arrangements communicating with the on-board process plant.

When arriving at the location of the subsurface permanent storage reservoir, the ship must be kept at a relatively exact position. In shallow water, for example less than 200 m, the ship may be kept in position by means of a free weathervaning anchoring system. However, in deeper water, for example more than 200 m, keeping a ship in position by means of an anchoring system, may be impractical or even impossible. It is therefore an advantage if the ship is provided with a Dynamic Positioning System (DPS). A DPS is a computer-controlled system to automatically maintain a ship's position and heading by using its own propellers and thrusters. Position reference sensors, combined with wind sensors, motion sensors and gyrocompasses provide information to the computer pertaining to the ship's position and the magnitude and direction of environmental forces affecting its position. Preferably, the ship is provided with both a Dynamic Positioning system DPS and an anchoring system allowing for free weathervaning.

In one embodiment is the ship according to the invention a superannuated shuttle tanker, wherein a portion of the at least one vessel is housed within a storage tank originally installed in the shuttle tanker.

In a second aspect the invention there is provided a method for bringing liquified gas, such as liquified carbon dioxide ($CO_2$), across a sea from an onshore terminal gas, to a subsurface permanent storage reservoir, the method comprising:
   transferring the liquified gas from the onshore terminal to a ship according to the first aspect of the invention;
   bringing the ship to and positioning the ship with respect to an inlet of the subsurface permanent storage reservoir;
   providing fluid communication between the at least one vessel of the ship and the inlet of the subsurface permanent storage reservoir; and
   injecting the liquified gas from the at least one vessel into the permanent subsurface storage reservoir by means of the injection processing module of the process plant.

The method may further comprise providing the process plant with a liquifying processing module configured for liquifying gas, the liquifying processing module configured for being set in loop communication with the at least one vessel for re-liquifying gas evaporated from the liquified gas within the at least one vessel.

The liquifying processing module may be in operation during loading of the liquified gas into the at least one vessel. Additionally, or alternatively to, operating the liquifying processing module during loading, the liquifying processing module may be in operation during voyage across sea from the onshore terminal to a location of the subsurface permanent storage reservoir.

Preferably, re-liquifying of the evaporated gas by means of the liquifying processing module commences at start of or during loading of the liquified gas into the at least one vessel.

In a preferred embodiment, the positioning of the ship with respect to the inlet of the subsurface permanent storage reservoir is provided by means of dynamic positioning. A positioning of the ship is may alternatively, or additionally, be provided by means of a free weathervaning anchoring system. A combination of positioning the ship by means of a DPS and a free weathervaning anchoring system, may be advantageous with respect to reducing the use of the propellers, and thereby reducing gas emission from the combustion engine(s) of the ship.

Preferably, providing fluid communication between the at least one storage vessel and the inlet of the subsurface permanent storage reservoir comprises connecting an injection line of the ship to an upper end portion of a flexible injection hose configured for communicating fluid through the inlet of the subsurface permanent storage reservoir. The injection line of the ship may typically be connected to the flexible injection hose by means of a submerged loading buoy or a catenary anchor leg mooring or similar connection mechanisms allowing for communication of fluid from the ship 1 to the seabed SB.

In a third aspect of the invention a superannuated crude oil shuttle tanker adapted for bringing liquified gas, such as liquified $CO_2$, from an onshore terminal for captured gas directly to a subsurface permanent storage reservoir, is used as the ship according to the first aspect of the invention.

BRIEF DESCRIPTION OF THE DRAWINGS

In the following is described examples of preferred embodiments illustrated in the accompanying drawings, wherein:

FIG. 2c shows in larger scale detail A of FIG. 2a; and

DETAILED DESCRIPTION OF THE DRAWINGS

Figure 1A:
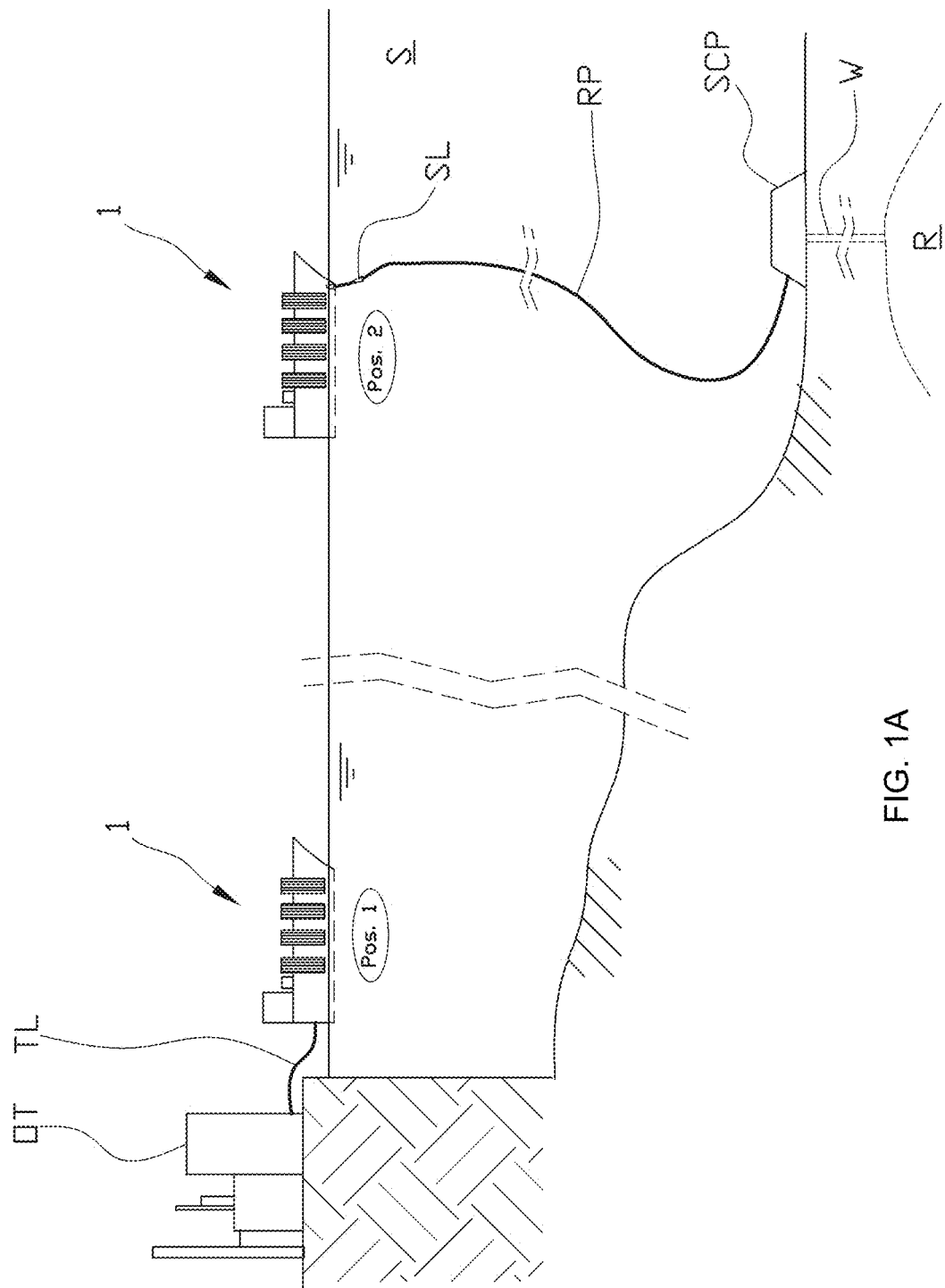
FIG. 1a shows a principle drawing of a ship in a loading state at an onshore terminal, and a subsequent reservoir injecting state wherein the ship is operatively connected to a subsurface permanent storage reservoir.

In the description, positional indications such as for example above, below, right, refer to the position shown in the figures.

Same or corresponding elements are indicated by same reference numerals. For clarity reasons some elements may in some of the figures be without reference numerals.

A person skilled in the art will understand that the figures are just principle drawings. The relative proportions of individual elements may also be strongly distorted.

The examples are related to a liquified gas in the form of captured $CO_2$ that has been captured and liquified by $CO_2$ emitters and that has been transported to the onshore terminal. However, it should be noted that the liquified gas may be other liquified gases as mentioned above wherein there may be a desire of permanently safe storage in a subsurface reservoir.

In the figures, the reference numeral 1 indicates a ship according to the invention. In the embodiment shown, the ship, here shown as a tanker 1, comprises compartments 3 wherein each compartment 3 houses a plurality of vertical vessels 5 arranged adjacent each other and configured for holding liquified carbon dioxide ($CO_2$).

A first portion of the vertical vessels 5 extends above a main deck 7 of the ship, while a second portion of the vertical vessels 5 is housed within the compartments 3.

In the embodiments shown, the ship 1 is a superannuated crude oil shuttle tanker designed with crude oil storage tanks that are modified to form the compartments 3 for housing the $CO_2$ vessels 5. The originally designed storage tanks are modified by providing opening or openings for the top portion of the $CO_2$ vessels 5. The rest of the storage tanks that form the compartments 3 of the ship or tanker 1 according to the invention, are maintained substantially as designed for the superannuated crude oil shuttle tanker. Therefore, substantially no redesign of the load carrying structure of the superannuated crude oil tanker is required.

FIG. 1a shows a principle drawing of a ship 1 being in a loading state at an onshore terminal OT for captured $CO_2$ (indicated as Pos. 1 in the figure), and in a subsequent reservoir injecting state (indicated as Pos. 2 in the figure) wherein the ship 1 has moved across the sea S and is operatively connected to a subsurface permanent storage reservoir R via a Subsea Connection Point (SCP) to a well W for the subsurface permanent storage reservoir. However, the principle shown in FIG. 1 may also be applicable for a so-called Direct Shuttle Loading (DSL) wherein a first ship (indicated as Pos. 1 in FIG. 1a) is moored at a loading jetty (not shown), and a second ship (indicated as Pos. 2 in FIG. 1a). In said DSL, the first ship and second ship are operated in a substantially continuous operation between the loading jetty and the location of the subsurface permanent storage reservoir.

A person skilled in the art will appreciate that the Subsea Connection Point may be operatively connected to a plurality of wells. The subsurface permanent storage reservoir R is in the embodiment shown an abandoned petroleum reservoir. The SCP is operatively connected to a flexible injection hose RP wherein an end portion of the flexible injection hose RP is provided with a submerged loading buoy SL. In an inactive position, the submerged loading buoy SL floats in an equilibrium position approximately 30-50 meters below sea level. The submerged loading buoy SL is moored to a seabed SB by means of anchor lines (not shown).

As an alternative to connecting the ship 1 to the subsurface permanent storage reservoir R via a submerged loading buoy SL, the ship 1 may be connected to the subsurface permanent storage reservoir R via a catenary anchor leg mooring (CALM) or similar connection mechanisms allowing for communication of fluid from ship 1 to seabed SB.

Figure 1B:
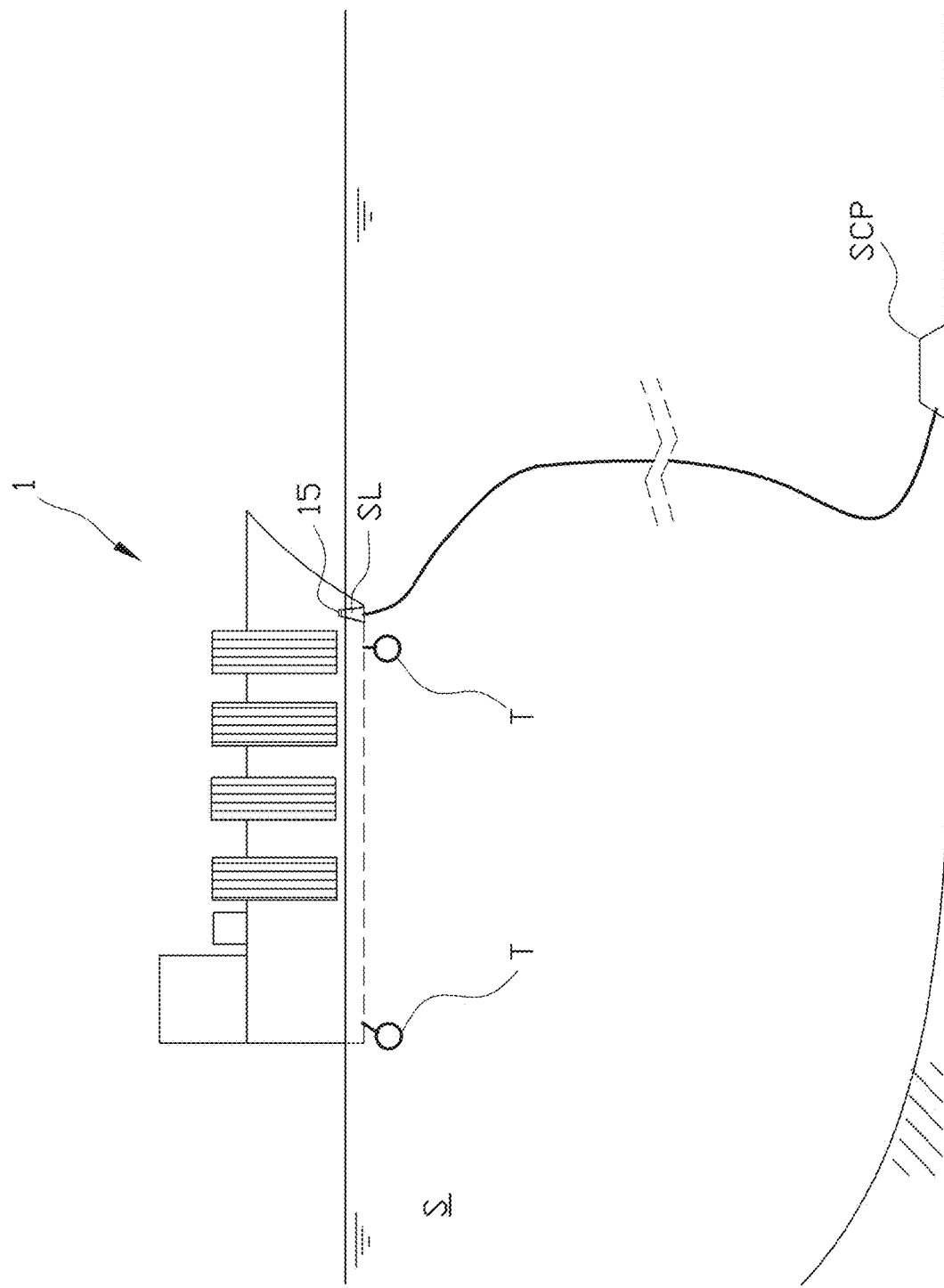
FIG. 1b shows in larger scale a principle drawing of the ship in FIG. 1a being in the reservoir injecting state.

In the reservoir injecting state (Pos. 2 to the right in FIG. 1a), the ship 1 is kept at a desired position by means of a Dynamic Positioning System DPS to automatically maintain the ship's position and heading by using its own propellers and thrusters T as indicated in FIG. 1b. It should be noted that prior to commencing the injection of the $CO_2$, the submerged loading buoy SL shown in FIG. 1a is operatively connected to the ship 1 as shown in FIG. 1b.

Figure 2A:
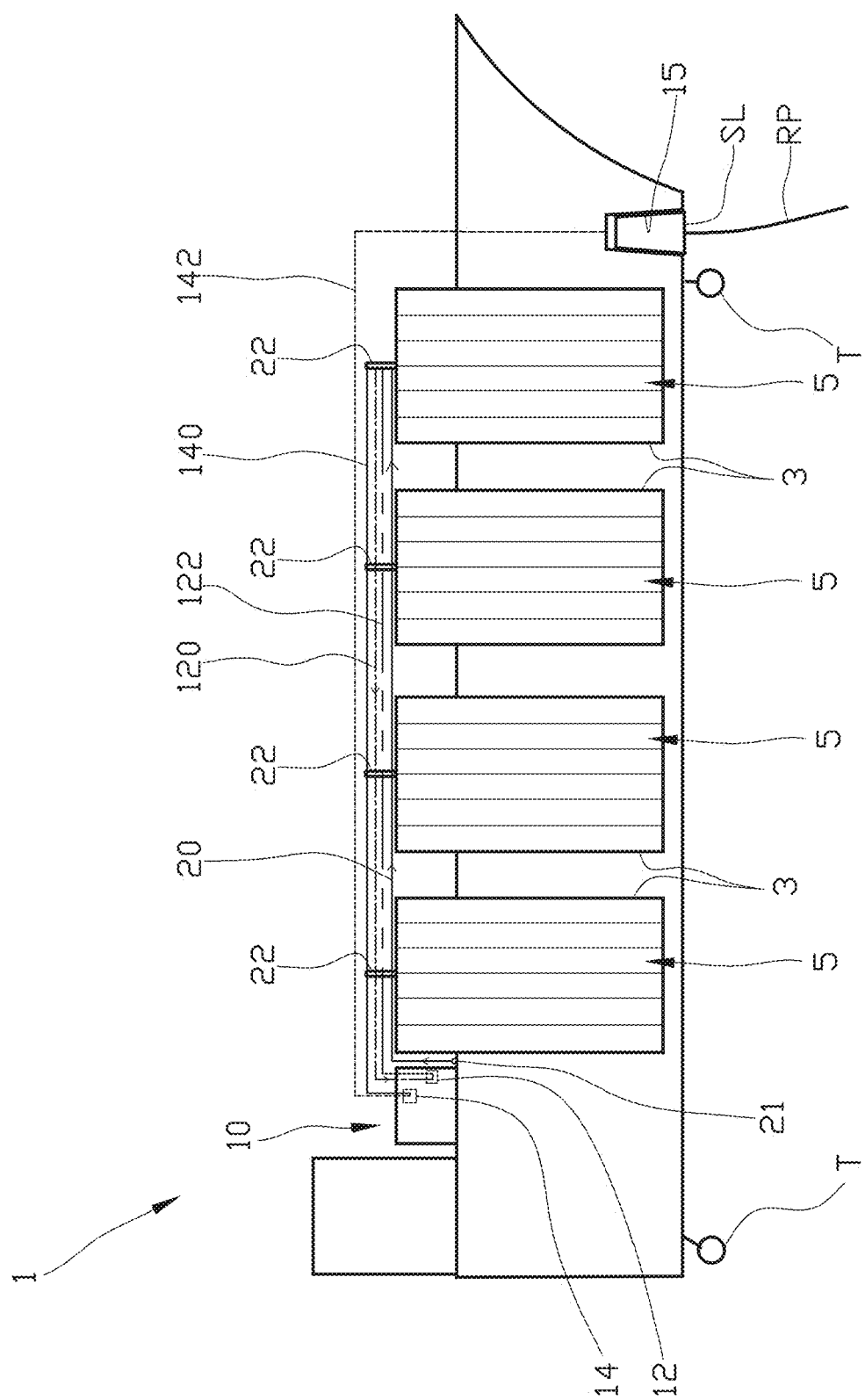
FIG. 2a shows in larger scale a principle drawing of a side view of the ship.
Figure 2B:
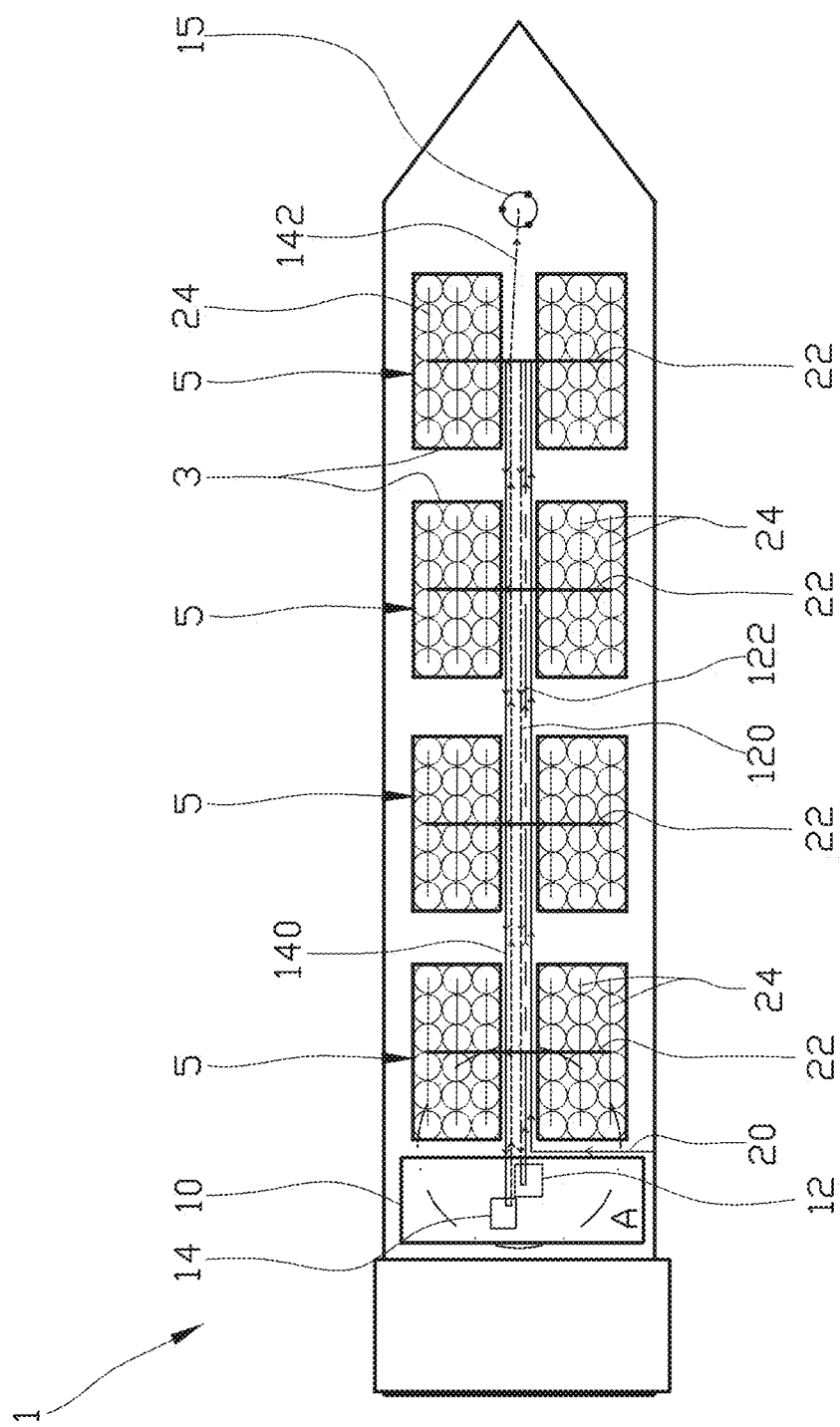
FIG. 2b shows the ship in FIG. 1 seen from above.
Figure 2C:
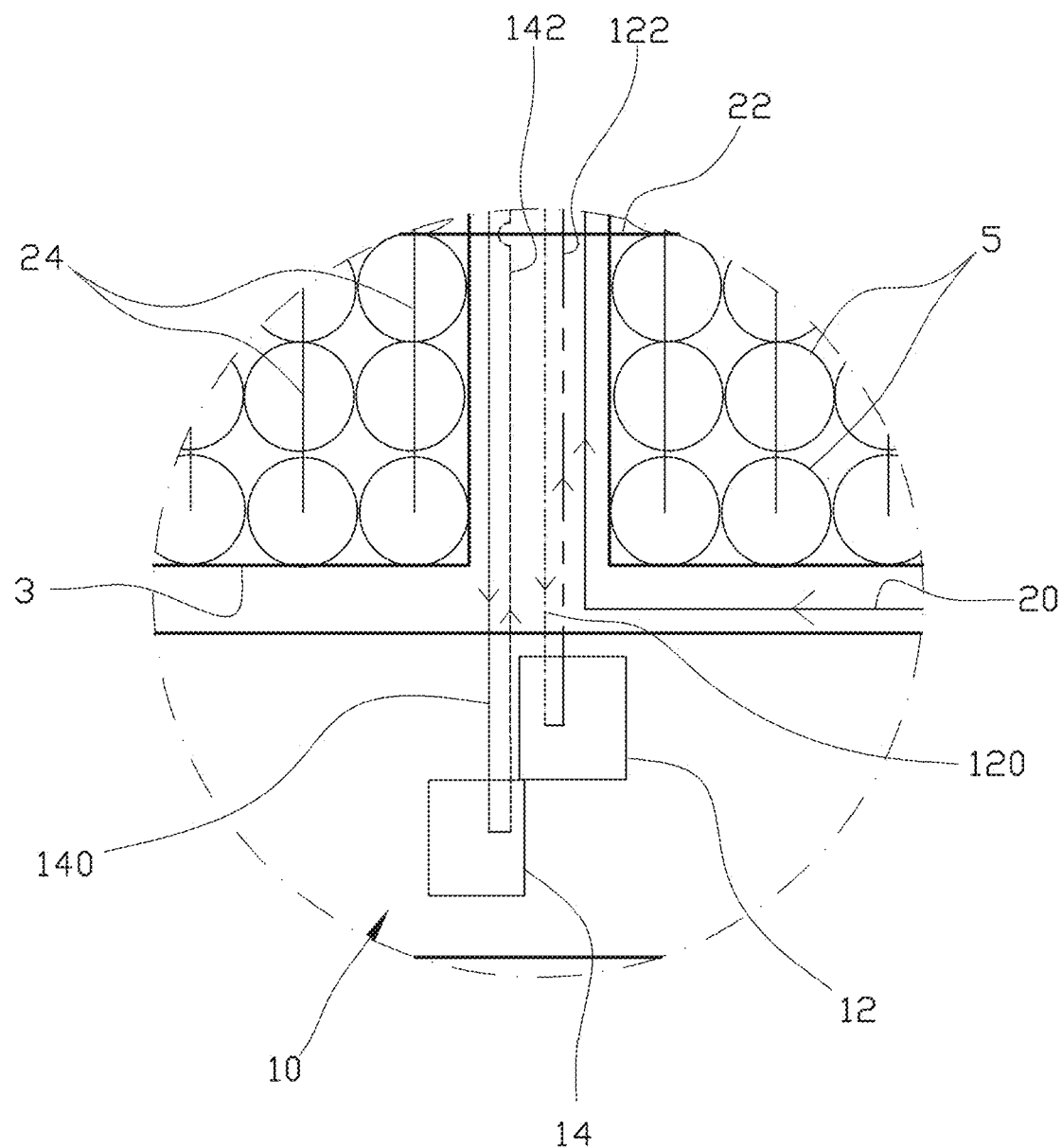

Turning now to FIGS. 2a-2c, the ship 1 is provided with a compartment 15 at a bow of the ship 1. The compartment 15 comprises a conical recess and lifting appliances (not shown) for lifting the submerged loading buoy SL into the compartment 15 and securing the loading buoy SL within the compartment (see FIG. 1b) as will be appreciated by a person skilled in the art.

The ship 1 comprises a loading line 20 having connector 21 for connecting to a terminal loading line TL (see FIG. 1a). The loading line 20 is connected to distribution manifolds 22 operatively connected to each vessel 5 (ninety-six shown in FIG. 2b) via submanifolds 24, one for each row of vessels 5 within each cluster of vessels 5 defined by the each of the six compartments 3 shown in FIG. 2b.

The manifolds 22 and submanifolds 24 comprises four parallel pipeline systems as will be explained below.

The loading line 20 discussed above is connected to the vessels 5 via loading pipelines forming a first pipeline system of the manifolds 22 and submanifolds 24.

The ship 1 further comprises a processing plant 10. The processing plant 10 comprises a liquifying processing module 12 configured for liquifying gaseous $CO_2$, and an injection processing module 14 configured for injecting liquified $CO_2$ into the subsurface permanent storage reservoir R. Injection pumps (see FIG. 3) of the injection processing module 14 are configured for an injection pressure adapted to a pressure in the subsurface permanent storage reservoir R.

During loading of the liquified $CO_2$ from the onshore terminal OT, and until the $CO_2$ is injected into the subsurface permanent storage reservoir, some of the liquified $CO_2$ will undergo a phase change from liquified state to gas state, i.e., some of the $CO_2$ will evaporate.

Instead of releasing the $CO_2$ to the atmosphere, the evaporated $CO_2$ is communicated into the liquifying processing module 12 configured for liquifying gaseous $CO_2$ via a degassing line 120 operatively connected to each of the vessels 5 via degassing pipelines forming a second pipeline system of the manifolds 22 and submanifolds 24. In the liquifying processing module 12, the gaseous $CO_2$ is reliquefied and returned to the vessels 5 via a return conduit 122 and degassing return pipelines forming a third pipeline system of the manifolds 22 and submanifolds 24. Thus, degassing line 120 and the return conduit 122 is arranged in a loop comprising the vessels 5 and the processing module 12. The liquifying processing module 12 comprises a pressure increasing device and a cooling element known per se.

The injection processing module 14 of the process plant 10 is operatively connected to the vessels 5 via an injection module supply line 140. The injection module supply line 140 is operatively connected to each of the vessels 5 via injection supply pipelines forming a fourth pipeline system of the manifolds 22 and submanifolds 24. In the injection processing module 14, the liquified $CO_2$ is further pressurised and heated by a heating element before it is communicated into an injection line 142 and into the subsurface permanent storage reservoir R (see FIG. 1a) via the buoy SL and the flexible injection hose RP. The injection line 142 bypasses the manifolds 22 as best seen in FIG. 2c.

The liquified $CO_2$ flowing in the injection line 142 may typically be heated to a temperature of for example 4° C. to avoid formation of ice plugs in the injection line 142 and in the flexible injection hose RP. The heating element of the injection processing module may comprise a heat exchanger. Such a heat exchanger may be configured for heat exchange with for example sea water or exhaust from a combustion engine of the ship 1.

From the above it should be appreciated that a length of the flexible injection hose RP is extremely limited as compared with an injection pipeline running from an onshore terminal to an inlet of a subsurface permanent storage reservoir as suggested in the "Northern Lights Project Concept Report" mentioned above. Further, a ship bringing the captured $CO_2$ to a position above a subsurface permanent storage reservoir R is flexible in that no new pipeline infrastructure has be installed in the seabed when a storage reservoir has been saturated and a new subsurface permanent storage reservoir is required.

Due to the liquifying processing module 12 of the ship 1, the ship 1 may be in a "standby" position relatively nearby the relevant storage reservoir for several days without losing any of the $CO_2$ load caused by evaporation of the liquified $CO_2$. Keeping the ship 1 in a standby position may be necessary for example due to harsh weather conditions or a que of ships waiting for access to the submerged loading buoy SL.

Figure 3:
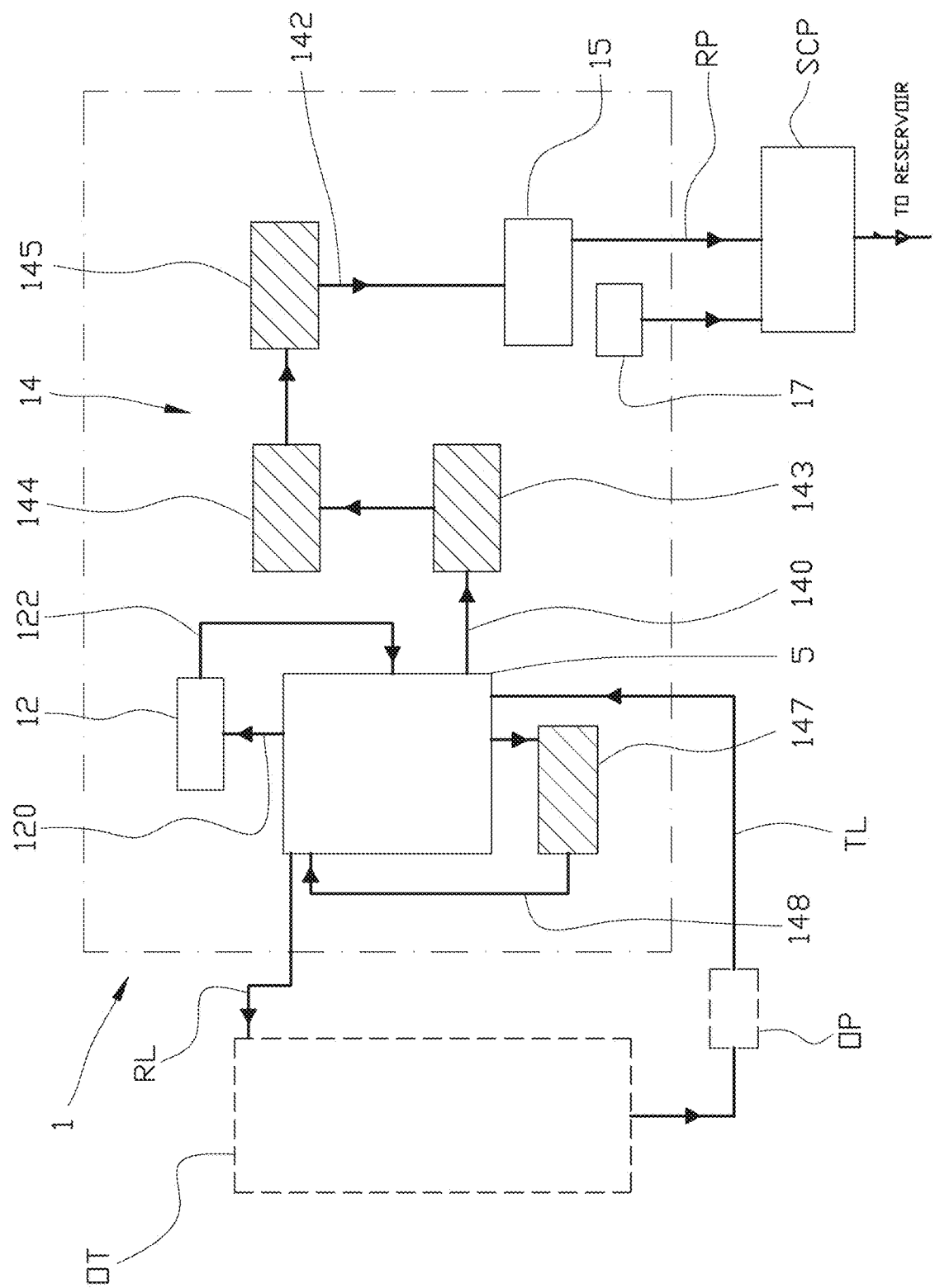
FIG. 3 shows a simplified process outline of an embodiment of the invention.

Turning now to FIG. 3 showing a process outline for the process from an onshore terminal OT, via the ship 1 to the subsurface connection point SCP operatively connected to for example, but not limited to, a submerged loading buoy SL as shown in FIGS. 1a-2b, or a catenary anchor leg mooring (CALM) or similar connection mechanisms allowing for communication of fluid from ship 1 to seabed SB.

In FIG. 3, elements forming part of the ship or tanker 1, is indicated within dash-dot lines. Further, elements forming part of the injection module 14 are indicated by hatching.

The liquified $CO_2$ is transferred from one or more tanks of an onshore terminal OT, via terminal loading line TL, to the at least one vessel 5 of the ship 1. The terminal loading line TL comprises a loading line pump OP. The $CO_2$ may in this stage have a pressure of for example 15 bar and a temperature of −25° C. An equalisation line RL extends from the vessel 5 to the tanks of the onshore terminal OT so that the volume of the liquified $CO_2$ pumped out of the onshore terminal tanks is compensated by evaporated $CO_2$ from the vessel 5 of the ship 1.

After finishing loading of the $CO_2$ into the vessel 5, the loading line TL and the equalization line RL are disconnected from the ship 1 whereinafter the ship 1 starts its crossing to a location of the subsurface permanent storage reservoir.

At the location of the subsurface permanent storage reservoir, the vessel 5 of the ship 1 is operatively connected to the subsurface permanent storage reservoir via a floating buoy system.

The floating buoy system may be a CALM (catenary anchor leg mooring) buoy, or an anchor moored submerged loading buoy, including a swivel, which will allow for free weathervaning of the ship when connected. The selection of buoy system will depend on water depth and weather conditions on location. Thus, in FIG. 3, the reference numeral 15 indicates a connection point between the flexible injection hose RP and the ship 1.

When commencing the injection operation, the injection module 14 is activated. The injection module 14 comprises a transfer pump 143 configured for increasing the pressure of the liquified $CO_2$ flowing into a heater 144. In the heater 14, the pressure may be for example 50 bar. The heater 144 is configured for increasing the temperature of the liquified $CO_2$ to avoid phase transition of the $CO_2$ from liquified state to solid state when flowing through the flexible injection hose RP and the subsea connection point SCP. The temperature of the liquified $CO_2$ flowing out of the heater 144 is adapted to an ambient temperature of the flexible injection hose RP at a lower end portion thereof, and an injection pressure provided by an injection pump 145 arranged downstream of the heater 144. The injection pressure is adapted to a pressure within the subsurface reservoir. The liquified $CO_2$ being injected may for example have a temperature of 4° C. and a pressure of 120 bar.

The process outline shown in FIG. 3 further comprises a vaporization unit 147 arranged in a loop 148 operatively connected to an outlet and an inlet of the vessel 5. The vessel 5 may comprise a plurality of vessels as shown in FIGS. 1a-2c. The purpose of the vaporization unit 147 is to compensate for the volume of liquified $CO_2$ being injected into the reservoir, and thus maintaining the desired pressure within the vessel 5 (or vessels).

The process outline shown in FIG. 3 further comprises a liquifying processing module 12 forming part of the processing plant 10. The liquifying processing module is configured for liquifying gaseous $CO_2$ evaporating from the vessel 5 during loading of the liquified $CO_2$, and during transport from the onshore terminal OT and until the process of injecting the liquified $CO_2$ into the subsurface permanent storage reservoir R commences. The $CO_2$ liquified by means of the liquifying processing module 12 is communicated back into the vessel 5 via return conduit 122. Thus, substantially no load is lost.

The ship 1 may further comprise a control system 17 known per se for controlling a wellhead control package comprising subsea valves and the well of the subsurface permanent storage reservoir R. The control system 17 is configured for supplying hydraulic power, monoethylenglycol (MEG), electrical power and signals to the wellhead. The hydraulic power may be provided by means of a water based hydraulic power system being in fluid communication with ambient water. The control system 17 is further operatively connected to a chemical injection line 17' for injecting for example monoethylenglycol into the subsea connection point SCP and the flexible injection hose RP prior to disconnecting the ship from the flexible injection hose RP so that the flexible injection hose and subsea connection point is prepared for a new load of $CO_2$.

In an alternative embodiment (not shown) a control system corresponding to the system 17 discussed above, may be arranged separately from the ship 1, for example from a distant offshore platform operatively connected to the subsea connection system SCP.

A person skilled in the art will appreciate that any subsea connection point provided with a flexible injection hose must be provided with an emergency system being activatable in the event of emergency disconnect from a ship operatively connected to a flexible injection hose. An emergency disconnect will typically occur in a situation wherein the ship is subject to an uncontrolled drive- or drift-off. For a flexible injection hose configured for receiving liquified $CO_2$, such an emergency system will be configured for operating independently of the ship and will comprise an accumulator and a reservoir containing an antifreeze agent to maintain pressure in the flexible injection hose when disconnecting from the ship in case of an emergency.

From the disclosure herein, it will be appreciated that the present invention has great advantages as compared with prior art solutions. No re-loading of liquified $CO_2$ collected from an onshore terminal OT is required as the ship 1 brings the collected $CO_2$ directly to a location above the subsurface permanent storage reservoir R wherein the ship 1 is connected to a flexible injection hose RP. Thus, apart from a flexible injection hose RP, subsea structures, and an appurtenant connection point, no additional onshore or offshore injection facility and infrastructure is required between the onshore terminal OT and the subsea connection point SCP. The invention therefore represents a cost-effective alternative, while at the same time representing a limited $CO_2$-footprint. The system is flexible as regards various subsurface permanent storage reservoir.

It should be noted that the fluid flow within the lines, conduits and manifolds are controlled by means of pumps and valves which are controlled from a control room of the ship.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. A ship for bringing liquified gas, such as liquified carbon dioxide, $CO_2$, from an onshore terminal across a sea to a subsurface permanent storage reservoir, the ship comprising a loading line for communicating liquified gas received from the onshore terminal into a plurality of vessels onboard the ship, and a processing plant, wherein the processing plant comprises:

an injection processing module comprising an injection pump configured for injecting the liquified gas into the subsurface permanent storage reservoir;

wherein the injection processing module is operatively connected to the plurality of vessels and a gas injection line provided with a connector for connecting to a flexible injection hose extending from a subsea connection point being connected to a well of the subsurface permanent storage reservoir, wherein the ship is a shuttle tanker comprising a storage tank having a larger volume than the plurality of vessels, and wherein each vessel in the plurality of vessels includes a housing having a first portion housed within the storage tank and a second portion extending out of the storage tank and above a deck of the ship, and a liquifying processing module configured for liquifying gas, wherein the plurality of vessels is in loop communication with the liquifying processing module so that gas that is evaporated from the liquified gas in the plurality of vessels is liquified in the liquifying processing module and communicated back into the plurality of vessels.

2. The ship according to claim 1, wherein pipes for communicating gas from the plurality of vessels to the process plant are connected to the second portion of the plurality of vessels.

3. The ship according to claim 1, wherein the plurality of vessels are oblongness, and wherein a longitudinal axis of each vessel in the plurality of vessels is substantially perpendicular to a surface of the deck.

4. The ship according to claim 1, wherein the ship is provided with at least one of a Dynamic Positioning System and an anchoring system allowing for free weathervaning.

5. The ship according to claim 1, wherein the ship is a superannuated shuttle tanker, and wherein the storage tank is a storage tank that was originally installed in the shuttle tanker.

6. A method for bringing liquified gas, from an onshore terminal, across a sea to a subsurface permanent storage reservoir, the method comprising:

transferring the liquified gas from the onshore terminal to the ship according to claim 1;

bringing the ship to and positioning the ship with respect to an inlet of the subsurface permanent storage reservoir;

providing fluid communication between the plurality of vessels and the inlet of the subsurface permanent storage reservoir; and injecting the liquified gas from the plurality of vessels into the permanent subsurface storage reservoir via the injection processing module.

7. The method according to claim 6, wherein the positioning of the ship relative to the inlet of the subsurface permanent storage reservoir is provided by dynamic positioning.

8. The method according to claim 6, wherein the positioning of the ship with respect to the inlet of the subsurface permanent storage reservoir is provided by a free weathervaning anchoring system.

9. The method according to claim 6, wherein providing fluid communication between the plurality of vessels and the inlet of the subsurface permanent storage reservoir comprises connecting an injection line of the ship to an upper end portion of a flexible injection hose configured for communicating fluid through the inlet of the subsurface permanent storage reservoir.

10. The method according to claim 6, further comprising adapting a superannuated crude oil shuttle tanker for bringing the liquified gas from the onshore terminal directly to the subsurface permanent storage reservoir, and using the superannuated crude oil shuttle tanker as the ship.

\* \* \* \* \*